United States Patent [19]

Orlando et al.

[11] 4,328,967
[45] May 11, 1982

[54] LIGHTWEIGHT BOWLING BALL

[75] Inventors: Samuel J. Orlando; Charles M. Miller, Jr., both of San Antonio, Tex.

[73] Assignee: Columbia Industries, Inc., San Antonio, Tex.

[21] Appl. No.: 106,749

[22] Filed: Dec. 26, 1979

[51] Int. Cl.³ ............................................. A63B 37/14
[52] U.S. Cl. ............................... 273/63 G; 273/63 D; 264/299
[58] Field of Search ............... 273/63 R, 63 D, 63 G, 273/63 E, DIG. 20

[56] References Cited

U.S. PATENT DOCUMENTS

| | | | |
|---|---|---|---|
| 3,068,007 | 12/1962 | Satchell | 273/63 G |
| 3,090,620 | 5/1963 | Consolloy | 273/63 R |
| 3,202,742 | 8/1965 | Bachelder et al. | 273/63 G |
| 3,206,201 | 9/1965 | Hendricks | 273/63 R |
| 3,248,113 | 4/1966 | Baggenstoss et al. | 273/63 R |
| 3,256,018 | 6/1966 | Baggenstoss | 273/63 R |
| 3,270,108 | 8/1966 | Randolph | 273/63 G X |
| 3,740,354 | 6/1973 | Dearmont | 273/63 R X |

*Primary Examiner*—George J. Marlo

*Attorney, Agent, or Firm*—Gunn, Lee & Jackson

[57] ABSTRACT

A bowling ball having an inner core and at least one thermosetting resin shell which contains sufficient lightweight particles, such as unicellular borsilicate glass spheres, having a diameter within the range of from about 10 to 100 microns and evenly dispersed therethrough to reduce the weight by volume of the shell by at least five percent below that of a similar volume of said thermosetting resin without said lightweight particles. The lightweight particles appearing on the outer surface of the shell will create a finely pitted texture. The manufacturing method comprises substantially uniformly dispersing lightweight unicellular particles in a thermosetting resin mass and molding the mass about an inner core while maintaining the particles substantially uniformly dispersed in the mass until the resin gels sufficiently to prevent substantial movement of said particles, minimizing air inclusions through the use of surfactants, proper agitation and vacuum, use of resins and conditions which promote rapid gelation, and use of such lightweight particles as will sufficiently lower the weight by volume of the resin and also maintain the integrity of the resultant bowling ball.

7 Claims, 3 Drawing Figures

LIGHTWEIGHT BOWLING BALL

BACKGROUND OF THE INVENTION

This invention relates to the manufacture of bowling balls and, more specifically, to lightweight bowling balls. Because a bowling ball must necessarily be of a certain diameter, hardness, and resiliency, and also have the capability of withstanding many inertial shocks without cracking, fracturing, or denting, bowling balls are typically manufactured to be solid throughout. One or more inner cores or shells may be used within the bowling ball, but the several parameters prescribed by the above conditions generally dictate that only certain high density materials be used. The bowling ball thus produced is therefore normally a heavy object.

BRIEF DESCRIPTION OF THE PRIOR ART

A. C. Baggentoss, et al. (U.S. Pat. No. 3,248,113), J. P. Hendricks (U.S. Pat. No. 3,206,201), F. F. Satchell (U.S. Pat. No. 3,068,007), A. C. Baggentoss (U.S. Pat. No. 3,256,018) and J. W. Consolloy (U.S. Pat. No. 3,090,620) all show methods of making bowling balls. It is known, as is shown by the above patents, that an outer resinous shell may be placed about an inner core to form a serviceable bowling ball. It is further known, as is shown in B. D. Dearmont (U.S. Pat. No. 3,740,354), that the bowling ball may be lightened by placing lightweight materials within the inner core.

Bowling balls typically have a circumference of about 27 inches, a diameter of about 8.5 inches, and are constructed without voids in the interior. Due to the many rigorous parameters which a bowling ball must satisfy (described above) and the structural properties of most lightweight materials, the inner core of a bowling ball may only be lightened a finite amount before the bowling ball's ability to successfully withstand repeated inertial shocks is impaired. Attempts to comprise the inner core solely of light styrofoam type materials and other light but structurally deficient materials have generally been ineffective. There is thus a practical limit beyond which a bowling ball may not be further lightened merely by lightening the inner core. Utilizing currently practical lightweight inner cores together with standard outer shells produces a bowling ball weighing approximately 10 pounds.

Many individuals, especially pre-teenagers, find bowling balls even with lightened inner cores to be so heavy as to be awkward and difficult to control. Efforts to further lighten bowling balls by lightening the outer shell have heretofore not been successful. The outer shell of the bowling ball is typically composed of a tough polyester resin material as is shown in the above noted patents. The polyester resin is a dense material and contributes substantially to the total weight of the bowling ball. Attempts to lighten the ball by reducing the thickness of the outer shell approach a practical limit due to the cracking, denting, and fracturing of a bowling ball which occur if it does not possess sufficient thickness. Furthermore, because of the mass production methods necessarily involved in casting thousands of such shells about inner cores, the available variables are extremely limited. To the best of applicant's knowledge, all prior attempts to lighten the overall weight of a bowling ball by lightening the polyester resin outer shell have failed. A commercial need exists for a light weight outer bowling ball shell and a method of making the same.

SUMMARY OF THE INVENTION

The present invention overcomes the problems of the prior art and provides novel lightweight bowling balls and the method of making the same, which balls have the necessary resilience, hardness, and long term resistance to inertial shock characteristics.

Briefly stated, the present invention comprises a bowling ball having an inner core and at least one thermosetting resin shell which contains sufficient lightweight particles having a diameter within the range of from about 10 to 100 microns and evenly dispersed therethrough to reduce the weight by volume of the shell by at least five percent below that of a similar volume of said thermosetting resin without said lightweight particles and the method of making the same as described below.

DESCRIPTION OF THE PREFERRED EMBODIMENT

In manufacturing a bowling ball according to the invention, known types of bowling ball manufacturing equipment are used. As is explained above, the manufacture of bowling balls containing a lightweight inner core is known in the art and such known cores are used in the present invention. It will be understood by those skilled in this art that a plurality of inner cores and/or outer shells of the same or of varying compositions may be used and provided for in the manner shown below for a bowling ball having a single inner core and a single outer shell. Moreover, while different thermosetting resins may be used to form the outer shell, it is preferred, and best results are obtained, when a polyester resin is used. For these reasons, the invention will be described in connection with the use of polyester resins.

Figure 1:
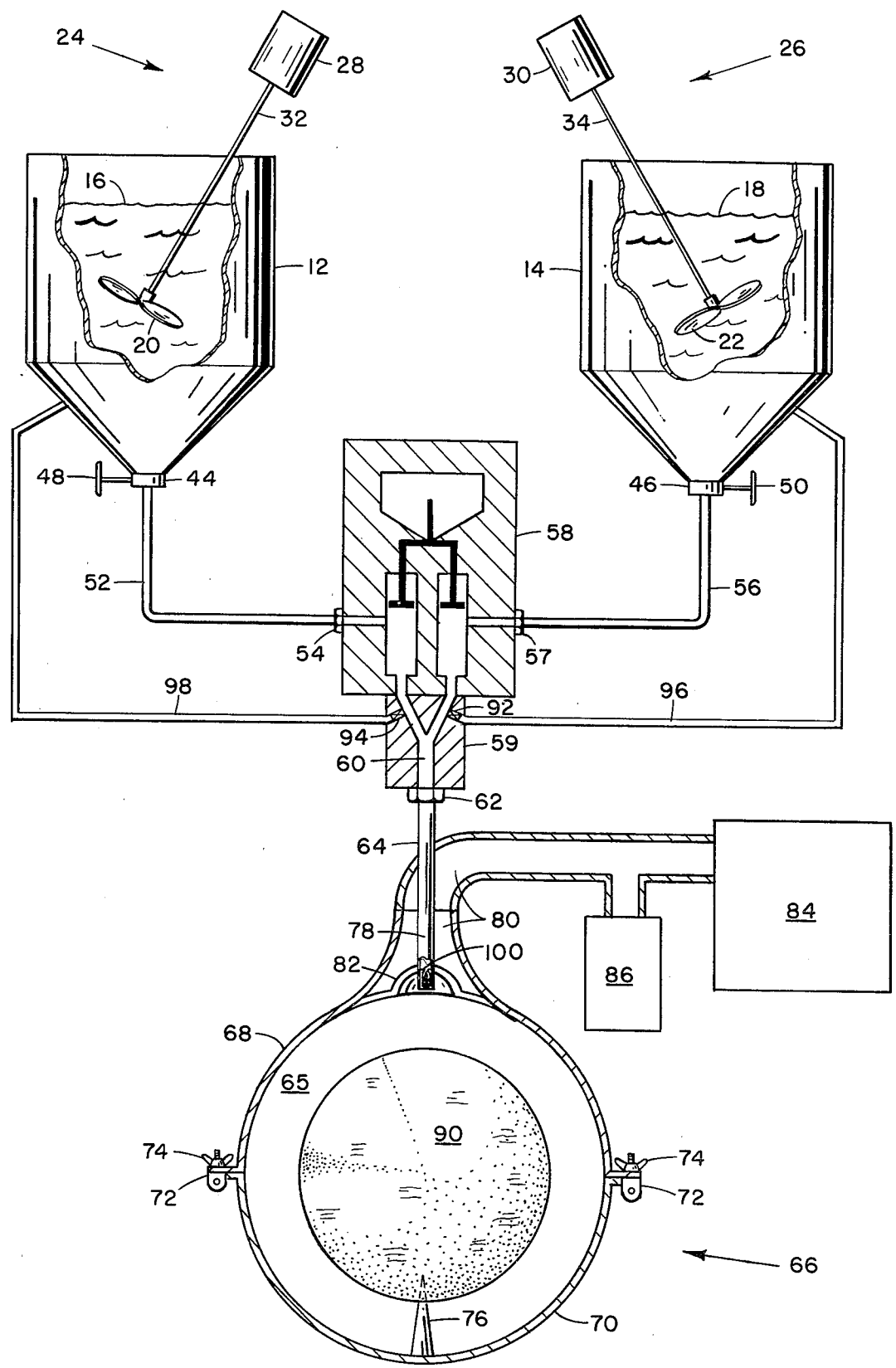
FIG. 1 is a view of the apparatus necessary to implement the described method of manufacture.

Referring to FIG. 1 of the drawings, there is shown an apparatus 8 for manufacturing the invented bowling ball having a lightweight outer shell 10.

Vat 12 and vat 14 contain polyester resin type premixtures 16 and 18, respectively, as shown. Polyester resin premixtures 16 and 18 are agitated and mixed by paddles 20 and 22 of mixers 24 and 26. Mixed motors 28 and 30 rotate mixer shafts 32 and 34 to which the paddles 20 and 22 are attached, respectively.

Vat 12 and vat 14 have sloping bases 36 and 38 which terminate at outlet openings 40 and 42. Outlet valves 44 and 46 are attached to outlet openings 40 and 42 and together with outlet valve handles 48 and 50 control any flow through the outlet openings 40 and 42. Pipe 52 connects vat 12 and valve 44 to inlet 54. Pipe 56 connects vat 14 and valve 46 to inlet 57. A two piston proportioning pump 58 expels predetermined quantities of premixture 16 and of premixture 18, and mixer 50 combines premixture 16 and premixture 18. Portions of the premixtures 16 and 18 not used in any given stroke of pump 58 are exhausted through mechanically operated valves 92 and 94, pipes 96 and 98, and back to their respective vats 12 and 14. Either static or motorized mixers 59 may also be used as is discussed below to combine premixtures 16 and 18 in the proportions desired to produce final mixture 60. Final mixture 60 is expelled through mixer outlet 62 and into conduit 64 which leads to mold space 65 located about bowling ball inner core 90 and within mold 66.

Mold 66 is composed of top mold half 68 and bottom mold half 70 which are fitted and clamped together by fittings 72 and clamps 74. Bottom mold half 70 contains pin 76. An inlet tube 78 and circumferential outlet tube 80 are connected to mold portal 82 as shown. A pressure sensitive poppet valve 100 prevents final mixture 60 from flowing through inlet tube 78 except when desired. The outlet tube 80 is connected to vacuum pump 84 and trap 86.

Although a polyester resin is preferred, most materials suitable for making bowling balls, such as polyurethane, vinyl esters, epoxies or any thermoset material, may be used. "Resin" is used in the generic sense and is defined as any thermosetting synthetic organic product with a high molecular weight and having high strength and moisture resistance characteristics when cured. Use of the term "resin" is further limited to such products as may usefully comprise a bowling ball or a bowling ball shell. While practically any resin having the desired characteristics may be used, polyester resin compounds of the type identified in the referenced patents or known in the art are typically used and are prepared by combining premixtures 16 and 18 within mixer 58.

A selected polyester resin utilized in the practice of the invention comprises the reaction product of at least one glycol selected from butylene glycol, diethylene glycol, dipropylene glycol, ethylene glycol, neopental glycol and propylene glycol with one or more acids or anhydrides selected from adipic acid, azelaic acid, fumaric acid, isophthalic acid, terephthalic acid, maleic anhydride and phthalic anhydride, wherein at least fumaric acid or maleic anhydride is used. Suitable monomers include one or more selected from alphamethyl styrene, chlorostyrene, methyl methacrylate, styrene and vinyl toluene. It is understood that each such polyester resin may be cured at room temperature or at elevated temperatures with suitable catalysts.

Any polyester resin conventionally used or suitable for manufacturing outer shells for bowling balls may be used if it can be modified as discussed below to tolerate the addition of the lightweight particles. A preferable combination which may be used is comprised of approximately 87% by weight of a rigid orthophthalic type polyester resin combined with approximately 13% flexible isophthalic type polyester resin. A satisfactory rigid polyester resin is sold under the trademark "Reichhold 32-113" and a satisfactory flexible polyester resin under the trademark "Reichhold 31-832", and both may be purchased from Reichhold Chemicals Incorporated, a well-known polyester resin supplier. The exact composition of these polyester resins is old in the art and no claim of novelty is made therein. To make a typical "batch" for making a number of bowling balls, approximately 600 pounds of this polyester resin mix is distributed approximately equally between vat 12 and vat 14. This is normally sufficient for manufacturing approximately 100 bowling balls, although the exact number will vary.

Any catalyst and promoter combination suitable for curing the polyester resins may be used, however, it is preferred to use a catalyst mixture containing approximately 1.1 pounds methyl ethyl ketone peroxide, 0.4 pounds tertiary butyl perbenzoate, and 0.4 pounds ditertiary butyl peroxide added to and mixed within the polyester resin mix of vat 12 and a promoter mixture of 1 pound of 2, 4-pentanedione together with 3.3 pounds of 12% cobalt octoate added to and mixed within the polyester resin mix of vat 14. Other common catalysts may also be used, including without limitations benzoyl peroxide, lauryl peroxide, 2, 4-pentaneodione peroxide, and many others. Other common promoters may also be used, including without limitation cobalt naphthenate, copper napthenate, dimethyl aniline, diethyl aniline, various quaternary ammonium salts, and many other amines. The two vat system of preparing the final mixture is necessary because the reactants cause an extremely rapid gel and cure when mixed.

While many different types of fillers may be used within the outer shell, only lightweight particles within a certain size density, strength, and chemical stability range may be usefully used to lighten the outer shell by over 5% and still maintain the desirable properties described in the Summary of the Invention. Upon experimentation, it was discovered that lightweight particles having average diameters within a 10 micron to 100 micron diameter range may be successfully used. Reference herein to "lightweight particles" is limited to particles having densities of less than 0.40 g/ml and having average diameters within the 10 micron to 100 micron range. The lightweight particles are next added to vats 12 and 14 in any manner as may be convenient and are mixed until a substantially equal distribution of the particles has been achieved.

The lightest particles may comprise hollow unicellular borosilicate glass spheres manufactured and sold by 3-M Company, Inc. The average true particle density of the hollow spheres is not less than 0.12 gm/cc nor greater than 0.18 gm/cc. Densities of up to 0.37 g/ml have been successfully used and densities up to 0.40 g/ml are contemplated. A preferable amount and type of hollow borosilicate glass spheres for the example mixture wuld be 25 pounds of type B23-510 glass bubbles as manufactured and sold by 3-M Company, Inc. Additional feasible glass bubble amounts and types which can be used in the example mixture are: 25 pounds of B-23-500, a 3-M Company product having a density of about 0.15 g/ml and an average diameter of about 50 microns; 23 pounds of E 22-X, a 3-M Company product having a density of about 0.22 g/ml and an average diameter of about 30 microns (which results in a smoother ball surface due to the smaller lightweight particle size); or 51 pounds of B 37-2000, a 3-M Company product having a density of about 0.15 g/ml and an average diameter of about 0.37 microns, blended with 7 pounds of B 23-500, a 3-M Company product having a density of about 80 and an average diameter of about 23 microns (thus illustrating the heavier high strength particles with lighter medium strength particles to achieve a satisfactory ball).

Another usable amount and type of lightweight particles for the example mixture is 22 pounds of 300 grade Q-cell inorganic microspheres, a sodium silicate microbubble manufactured by PQ Corporation in Valley Forge, Pa. This type Q-cell inorganic microspheres have an average diameter of about 0.70 microns and are generally slightly less dense (about 0.21 g/ml) than equivalently sized 3-M glass bubbles. A lesser proportion must be used, therefore, if an outer shell is to be produced which is as light as an equivalent 3-M glass bubble type outer shell. Another feasible lightweight particle formulation which can be feasibly used in the example mixture is 51 pounds of 3-M Company's B 37-2000 blended with 6.5 pounds of 300 grade Q-cell inorganic microspheres. Use of Q-cell inorganic microspheres having a 10 to 100 micron diameter is contemplated, however, Q-cell inorganic microspheres of approximately 60–70 micron diameter have been used most extensively.

Low density hollow spheres, such as 3-M's C 15-250, are more effective in lightening the outer shell as opposed to high or medium density spheres, such as 3-M's E 22-X. The lightweight particle flotation problems referred to elsewhere herein, however, are greatly aggrevated by the use of hollow spheres having an extremely low density. There are, therefore, practical upper and lower density parameters. Further, if the size of the individual hollow spheres is allowed to become large, the outer surface of the ball takes on a pitted or cratered appearance which is extremely unsightly. In general, a range of 10-190 microns is adequate with as narrow a range as possible being desirable. This normally entails sizing the lightweight particles by use of a series of screens or pneumatic separators. It has also been found preferable, therefore, to place an upper limit upon individual hollow sphere size by utilizing hollow spheres having average diameters of 40 microns or less. This practice provides the further benefit of giving a finished ball with a smoother, more attractive surface.

The wall thickness of the hollow spheres may be varied. Glass bubbles having thicker walls are more resistant to fracturing, give the bowling ball more impact resistance, and also reduce hollow sphere breakage during the mixing and molding process. Glass bubbles having thicker walls are heavier, however, than those with thinner walls. If thick walled hollow spheres are used, therefore, a greater proportion of the mixture must be hollow spheres and a lesser proportion polyester resin if a sufficient weight reduction is to be achieved. The converse is true for relatively more thin walled hollow spheres. Feasible grades and types of 3-M Company, Inc. glass bubbles includes types C-15-250, B-23-500, E-22-X, B-37-2000, and many others.

The same considerations are applicable concerning selection of the proper Q-cells to use. The 300 grade identified as preferable for the Q-cell is comparatively the densest and strongest Q-cell grade. Flotation problems and problems due to Q-cell breakage are thus considerably reduced by use of this grade.

The Q-cell outer surface has a rough texture and the glass bubbles have a smooth texture. Because of the greater interaction of the rough surface with the polyester resin compound, fewer flotation and settling problems occur upon use of the Q-cell than upon use of glass bubbles if a final mixture 60 of a proper viscosity is used. Any other lightweight filler, such as phenolic microballoons, epoxy bubbles, and fly ash products, may also be used.

One reason early attempts to use lightweight particles in the outer shell failed was due to foaming and other air entrapment caused by addition of the lightweight particles. Only after addition of proper surfactants in amounts sufficient to control the problem was further experimentation concerning the manufacture able to occur. Surfactants and wetting agents, such as Dow-Corning Antifoam A, ICI Span 80, or Triton X100 in amounts of the final mixture ranging from 0.1% to 1.0% of the weight of the resin were found to be effective in this regard.

A preferable amount and type for the batch amounts used in the example would be approximately 1 pound of a silicone surfactant sold under the trademark of "Dow-Corning Antifoam A Compound" and which may be purchased from Dow-Corning Company, Inc. The surfactant is added in equal amounts to vat 12 and to vat 14.

Additional means of degassing the premixtures 16 and 18 is to maintain the premixtures 16 and 18 in a comparatively low gas pressure environment before (about fifteen inches of mercury is preferred), during, and after addition of the lightweight particles. The low gaseous pressure inhibits formation of additional gas pockets within the premixtures 16 and 18 and induces release of such gas pockets which are created. The premixtures must be mixed very slowly until the dry materials are wetted prior to application of the vacuum.

Concurrent with or after addition of the surfactant, sufficient quantities of microscopic lightweight particles are added to the batch mixture.

When the materials within vats 12 and 14 are thoroughly mixed, the outer valves 44 and 46 are opened by means of outlet valve handles 48 and 50. Premixtures 16 and 18 thus flow through outlet openings 40 and 42, pipes 52 and 56, and to proportioning pump 58 and mixer 59. Proportioning pump 58 and mixer 59 positively displace equal amounts of each premixture 16 and 18, thoroughly mix them, and quickly expel them into the mold 66 via conduit 64.

While other types of pumps and mixers may be used, a two piston proportioning pump 58 provides the exact amounts needed to effectively combine promoters, catalysts, and resins, etc. Mixer 59 capable of mixing premixtures 16 and 18 without exposing either them or the final mixture 60 to air is used to reduce foaming and air entrapment.

In applying the lightweight outer shell 11 about the inner core 90, a particularly advantageous method is to situate the bowling ball inner core 90 within mold 66 and on top of pin 76 so that it is held equidistant from all sides of mold 65. Outlet tube 80 is connected to vacuum pump 84 and a vacuum maintained within the mold space 65 while the polyester resin lightweight particle compound enters mold 66 through inlet tube 78. In order to completely fill mold 66, some of the compound may be drawn into outlet tube 80 in which case it is caught by trap 86. Use of a mechanical vibrator will also help aid in releasing any remaining air bubbles.

The thickness of the polyester resin outer shell 11 created about inner core 90 may vary from 0.25 inches to about 1.25 inches, but is preferably kept within a range of 0.33 inches to 0.75 inches. Final mixture 60 then cures within mold 66 and about the inner core at such temperatures as promotes rapid curing. Curing within an oven at approximately 115° Fahrenheit over a period of approximately 10 minutes has been found to be a preferable method for the example batch mixture.

An extremely rapid change of the resin in the outer shell from the liquid phase to the solid phase is necessary to prevent substantial lightweight particle flotation or settling. The change from the liquid phase to solid phase preferably occurs within 20 minutes to prevent flotation problems. Because such flotation as does occur will primarily be of the larger lightweight particles, it is seen that such flotation would quickly mar the bowling ball surface with pits or indentations. The combination of polyester resins, catalysts, and promoters as described above, therefore, are selected partly for the rapid curing properties which the combination possesses. Other beneficial combinations include the benzoyl peroxide-dimethyl aniline system, t-butyl perbenzoate, etc.

Curing is the process of changing the properties of a resin or a resin mixture through chemical addition reactions. One of the differences between the present invention and the prior art is the present invention's emphasis upon the speed with which the initial phase of curing begin. A solid phase matrix or gel state sufficient to fix the lightweight particles prior to significant movement of the particles must be speedily affected once the even distribution of the particles is no longer being maintained through the stirring of the mixture. A rapid "green cure" is, therefore, deliberately achieved. A green cure or gel state is a state of the resin mixture in which sufficient bonding between the resin chains has occurred to give the mixture as a whole certain solid phase characteristics although insufficient bonding between the chains has occurred to give that solid state matrix significant strength. Because of the selection of lightweight particles within a density range precluding strong flotation or settling forces and because of the rapidly increasing viscosity within resin mixture, the first fragile solid phase matrix (gel point) is sufficient to fix the lightweight particles. As the curing progresses and the bonds between the resin chains become more numerous, the liquid phase is entirely eliminated and a solid phase of the resin mixture is produced having considerable strength.

A critical step of the method is the rapid formation of the high liquid phase viscosity as soon as stirring of the mixture ends. This high liquid phase viscosity prevents significant lightweight particle movement within the mixture pending complete fixation upon achievement of the green cure. After the green cure is achieved, the length of time necessary to achieve a full cure of the mixture is immaterial as concerns maintaining the lightweight particles in an even distribution throughout the outer shell of the bowling ball. Without the rapid onset of a high viscosity followed by a permanent fixing of the lightweight particles, the heavier lightweight particles would settle and the lighter lightweight particles would float, thus causing an uneven weight distribution within the completed outer shell of the bowling ball.

While the outer shell of the bowling ball is in a green state, it must be treated with great caution. Although the solid phase matrix is insufficiently strong to resist any impinging forces, deformations caused within it at this time may be retained as defects within the finished outer shell. These defects may either produce unsightly scars upon the surface or create possible fracture points within the outer shell, both of which would render the resulting bowling ball commercially unusable. The resin mixture must be maintained motionless, therefore, after the green cure is initiated and until a fuller cure develops.

After the outer shell has initially solidified sufficiently to maintain the lightweight particles in place, curing may usefully occur at practically any temperature within the proper reactants, if the temperature is a controlled one. The reactants of the example are preferably cured at 115° F., but by varying the catalysts promoters, and polyester resins, curing could be made to occur between 10° C. and 93° C. The period for curing may range between 25 minutes up to 24 hours.

Figure 2:
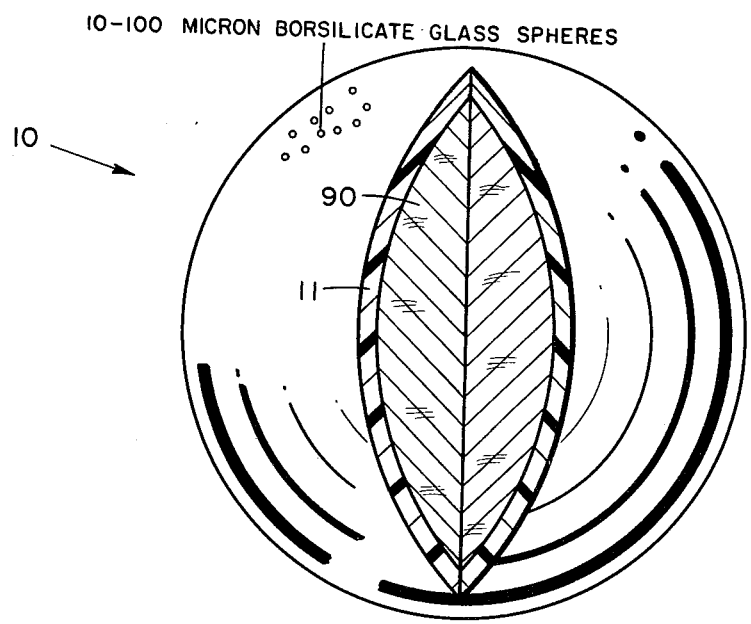
FIG. 2 is a cutaway view of a bowling ball having a lightweight outer shell.

FIG. 2 shows a cutaway view of the completed lightweight bowling ball 10 having an inner core 90 and a lightweight outer shell 11.

Another major problem is that of attaining a smooth finish together with an outer shell 11 which is balanced by weight about the bowling ball center point. A preliminary problem is of proper initial distribution of the lightweight particles. The viscosity of the premixtures must be considered in determining the proper agitation parameters due to the adverse effect of greater viscosity upon rapid and even distribution. Certain grades of lightweight particles will suffer greater destruction due to mechanical agitation than others as has been discussed above.

After the lightweight particles have been evenly distributed, it is difficult to maintain such distribution due to the problems of lightweight particle flotation and settling at this point in the process. High viscosity therefore, becomes an aid to maintaining the distribution as it slows down any lightweight particle movement due to flotation or settling. What is described in the example process, therefore, are premixtures 16 and 18 having low viscosities, which premixtures 16 and 18 upon combination into the final mixture 60 rapidly develop a higher viscosity or green cure. A complimentary technique is the addition of proper Thixotropic agents, such as Cabosil (fumed silica) or Aerosil, to the premixtures 16 and 18 after the lightweight particles have already been evenly distributed and any entrapped air freed. Mica flakes, glass flakes, or other dispersible platelet materials may also be used to retard lightweight particle movement. Also, small amounts of glycerine or other glycols may be useful.

If resins other than polyesters are used, their viscosity, gelling, and/or curing times must be regulated to substantially eliminate lightweight particle movement after the resins are placed in the mold.

Lightweight particles located upon the outer surface of the finished lightweight bowling ball mar the outer surface. The preferred method of dealing with this problem is use of sufficiently small and sufficiently strong lightweight particles as described above. Smaller lightweight particles more successfully resist breakage, have a smoother appearance, and produce an outer surface, which may be wiped clean. Large lightweight particles produce unsightly pits upon the outer surface which are difficult to clean.

Figure 3:
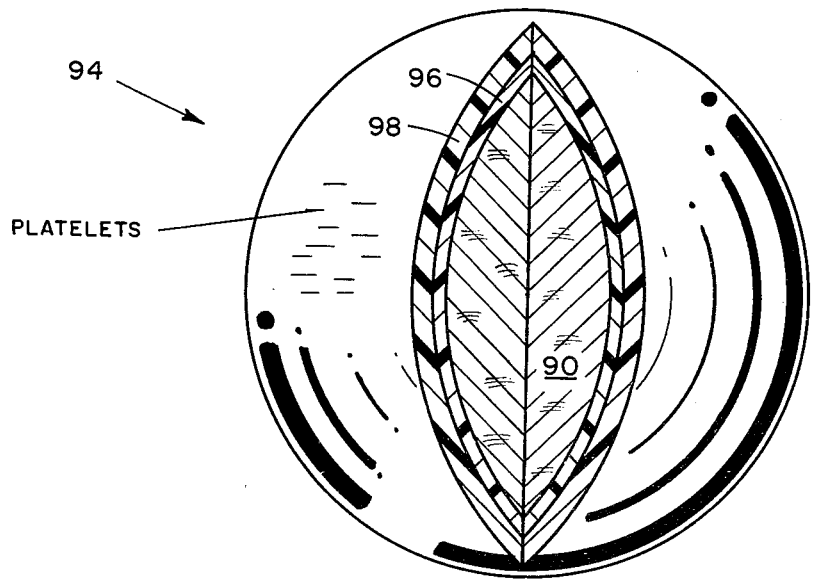
FIG. 3 shows a cutaway view of a double outer shell type bowling ball.

Another means of dealing with the problem is to utilize a double outer shell type of ball 94 wherein a first innermost outer shell 96 contains a large proportion of lightweight particles and a second outermost outer shell 98 is placed about the first outer shell. The second outer shell 98 could consist substantially entirely of polyester resin and serve to protect the first outer shell. FIG. 3 shows a cutaway view of the double outer shell type bowling ball 94 having a second outer shell 98 about a first lightweight shell 96.

Yet another means of producing a smooth outer shell is to utilize a mold having inner walls which are polished together with a non-shrink resin. The physical effect upon the outer shell is to produce a thin light particle-free outer skin upon the outer surface.

It is apparent from the above description that significant improvements in the art of lightweight bowling balls are achieved by the instant invention.

While the invention has been described in connection with the preferred embodiment, it is not intended to limit the invention to the particular forms set forth, but, on the contrary, it is intended to cover such alternatives, modifications, and equivalents as may be included within the spirit and scope of the invention as defined by the appended claims.

We claim:

1. A bowling ball comprising an inner core and at least one thermosetting resin shell about said inner core, said shell comprising a cured thermosetting resin having substantially uniformly distributed therethrough sufficient lightweight particles to reduce the weight per unit volume of said shell by at least five percent below that of the same volume of said cured thermosetting resin shell without said lightweight particles, substantially all of said lightweight particles having an average thickness within the range of from 10 microns to 100 microns.

2. The bowling ball of claim 1 wherein substantially all of such said lightweight particles as appear upon the surface of said bowling ball are evenly distributed over the outer surface of said ball and are sufficiently small in diameter to give said outer surface a finely pitted texture from which such dirt and grime as may accumulate thereon during normal use of said bowling ball may be removed.

3. The bowling ball of claim 1 which weighs under 9.5 pounds and has a circumference of about 27 inches, a diameter of about 8.5 inches, and is substantially without voids in said bowling ball's interior.

4. The bowling ball of claim 1 wherein said lightweight particles have an average thickness in the range from 10 microns to 40 microns and a density of less than 0.4 grams per milliliter.

5. The bowling ball of claim 4 wherein substantially all of said lightweight particles comprise hollow unicellular borsilicate glass spheres.

6. The bowling ball of claim 5 additionally comprising platelets substantially uniformly distributed throughout said thermosetting resin lightweight particle shell, said platelets being of sufficient type and quantity to have reduced lightweight particle flotation and lightweight particle settling during curing of said thermosetting resin lightweight particle shell.

7. A bowling ball comprising an inner core and at least one thermosetting resin shell about said inner core;
   said shell comprising a cured thermosetting resin having substantially uniformly distributed therethrough sufficient lightweight particles to reduce the weight per unit volume of said shell by at least five percent below that of the same volume of said cured thermosetting resin shell without said lightweight particles, substantially all of said lightweight particles having an average thickness within the range of from 10 microns to 40 microns;
   substantially all of such said lightweight particles as may appear upon the surface of said bowling ball are evenly distributed over the outer surface of said ball and are sufficiently small in diameter to give said outer surface a finely pitted texture from which such dirt and grime as may accumulate thereon during normal use of said bowling ball may be removed; and
   said bowling ball weighs under 9.5 pounds, has a circumference of about 27 inches, a diameter of about 8.5 inches, and is substantially without voids in said bowling ball's interior.

* * * * *